(12) United States Patent
Ferlitsch

(10) Patent No.: US 7,408,667 B2
(45) Date of Patent: Aug. 5, 2008

(54) SYSTEMS AND METHODS FOR PULL PRINTING WHERE RENDERING IS INITIATED AT THE PRINTER

(75) Inventor: Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 979 days.

(21) Appl. No.: 10/773,891

(22) Filed: Feb. 6, 2004

(65) Prior Publication Data

US 2005/0174599 A1 Aug. 11, 2005

(51) Int. Cl.
*G06F 15/00* (2006.01)

(52) U.S. Cl. .............. 358/1.15; 358/1.16; 358/1.18; 358/448; 358/464; 709/217; 709/218; 709/219; 709/203

(58) Field of Classification Search ........ 358/1.15, 358/1.16, 1.18, 448, 464; 709/217–219, 709/203
See application file for complete search history.

(56) References Cited

U.S. PATENT DOCUMENTS

| | | | |
|---|---|---|---|
| 6,348,972 B1 * | 2/2002 | Taniguchi et al. | 358/1.15 |
| 6,519,048 B1 | 2/2003 | Tanaka | |
| 7,304,757 B2 * | 12/2007 | Parry et al. | 358/1.15 |
| 2001/0029521 A1 | 10/2001 | Matsuda et al. | |
| 2001/0038462 A1 | 11/2001 | Teeuwen et al. | |
| 2002/0112037 A1 | 8/2002 | Koss | |
| 2002/0138564 A1 | 9/2002 | Treptow et al. | |
| 2003/0002073 A1 | 1/2003 | Berkema et al. | |
| 2003/0048470 A1 * | 3/2003 | Garcia | 358/1.15 |
| 2003/0053118 A1 * | 3/2003 | Muramoto et al. | 358/1.15 |
| 2003/0098990 A1 | 5/2003 | Nakamura | |
| 2004/0100651 A1 * | 5/2004 | Leone et al. | 358/1.15 |

FOREIGN PATENT DOCUMENTS

| | | |
|---|---|---|
| JP | 2001-350745 | 12/2001 |
| JP | 2002-287931 | 10/2002 |
| JP | 2002-297330 | 10/2002 |
| WO | WO 02/41133 | 5/2002 |

* cited by examiner

*Primary Examiner*—Edward L. Coles
*Assistant Examiner*—Chan S Park
(74) *Attorney, Agent, or Firm*—Madson & Austin (57) ABSTRACT

A method for pull printing a document wherein the rendering is initiated at a printer is disclosed. A document on a computing device is located from a printing device. A message is sent to the computing device to print the document with at least one print option. The document is rendered at the computing device into printer ready data using the at least one print option thereby providing a rendered document. The rendered document is de-spooled to the printing device. Another print option is processed on the printing device. The rendered document is printed on the printing device.

28 Claims, 9 Drawing Sheets

SYSTEMS AND METHODS FOR PULL PRINTING WHERE RENDERING IS INITIATED AT THE PRINTER

TECHNICAL FIELD

The present invention relates generally to imaging jobs sent to imaging devices through use of a computer. More specifically, the present invention relates to systems and methods for pull printing where rendering is initiated at the printer.

BACKGROUND

Computer and communication technologies continue to advance at a rapid pace. Indeed, computer and communication technologies are involved in many aspects of a person's day. For example, many devices being used today by consumers have a small computer incorporated within the device. These small computers come in varying sizes and degrees of sophistication. These small computers may vary in sophistication from one microcontroller to a fully-functional complete computer system. For example, small computers may be a one-chip computer, such as a microcontroller, a one-board type of computer, such as a controller, a typical desktop computer, such as an IBM-PC compatible, etc.

Printers are used with computers to print various kinds of items including letters, documents, pictures, etc. Many different kinds of printers are commercially available. Ink jet printers and laser printers are fairly common among computer users. Ink jet printers propel droplets of ink directly onto the paper. Laser printers use a laser beam to print.

Printers are a type of imaging device. Imaging devices include, but are not limited to, physical printers, multi-functional peripherals, a printer pool, a printer cluster, a fax machine, a plotter, a scanner, a logical device, an electronic whiteboard, a tablet PC, a computer monitor, a file, etc.

Different kinds of computer software facilitate the use of imaging devices. The computer or computing device that will be used to print the materials typically has one or more pieces of software running on the computer that enable it to send the necessary information to the printer to enable printing of the materials. If the computer or computing device is on a computer network there may be one or more pieces of software running on one or more computers on the computer network that facilitate printing.

When a document is desired to be printed, the document is either in a printer ready format or needs to be converted into a printer ready format that is compatible with the printer. Once the document is in a printer ready format (i.e., print job), the print job can be either pushed to the printer or pulled by the printer. In some computing environments it would be desirable to pull print the document from the printer where the rendering is initiated at the printer. Benefits may be realized by providing increased functionality to pull printing systems and methods.

A user may also choose to use the printer as a facsimile device, such as in a multi-functional peripheral (MFP), where rendering into a hardcopy or viewable softcopy output is deferred by transmitting the document to be printed to another destination device in a printer or fax ready format.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

A method for pull printing a document wherein the rendering is initiated at a printer is disclosed. A document on a computing device is located from a printing device. A message is sent to the computing device to print the document with at least one print option. The document is rendered at the computing device into printer ready data using the at least one print option thereby providing a rendered document. The rendered document is de-spooled to the printing device. Another print option is processed on the printing device. The rendered document is printed on the printing device.

At least one print option may be specified from the printing device after the document has been located. The print option may be specified through use of a front panel of the printing device.

The message may be sent to the computing device with a plurality of print options. In one embodiment the system may determine which of the plurality of print options are standard print options on the computing device and which of the plurality of print options are proprietary to the printing device. The proprietary print options may be stored on the printing device. An identification of the document may also be stored on the printing device. The identification of the document may include a filename. The rendered document may be recognized at the printing device through use of the identification and fetching the stored proprietary print options. The proprietary print options may be merged with the rendered document before the rendered document is printed. The proprietary print options may be fetched before the proprietary print options are merged with the rendered document.

In a further embodiment the message may be sent to the computing device to print the document with the standard print options. Additionally, the document may be rendered at the computing device into printer ready data using the standard print options. The document may be rendered at the computing device into printer ready data that is compatible with a page description language interpreter.

An application may be invoked on the computing device that is associated with the document format to background print the document using a generic printer driver.

The message sent to the computing device to print the document with the standard options may be sent to a pull print service running on the computing device.

In one embodiment, the document, at the time the user locates the document on the computing device, may be in a native document format and has not been pre-rendered into printer ready data.

A printing device configured for pull printing a document wherein the rendering is initiated at the printing device is also disclosed. The printing device includes a processor for control of the printing device and memory in electronic communication with the processor. A printer is in electronic communication with the processor for printing. A communications port is included for electronic communications with a computing device. A control panel is used for operation of the printing device by a user. The control panel is in electronic communication with the processor for receiving user inputs. The printing device further includes executable instructions configured to implement a method for pull printing a document wherein the rendering is initiated at a printer. In the method a user interface is provided at the control panel for the user to locate a document on the computing device. Print options are obtained from the user. The print options comprise standard print options that are standard on the computing device and proprietary print options that are proprietary to the printing device. The proprietary print options are stored. An identification of the document is also stored. A message is sent to the computing device to print the document with the standard print options. The document is received after it has been rendered by the computing device. The rendered document comprises printer ready data. The proprietary print options are merged with the rendered document before the rendered document is printed. The rendered document is printed using the printer.

A computer-readable medium for storing program data is also disclosed. The program data comprises executable instructions for implementing a method for pull printing a document wherein the rendering is initiated at the printing device. A user interface is provided at a printing device for a user to locate a document on a computing device. Print options are obtained from the user. The print options comprise standard print options that are standard on the computing device and proprietary print options that are proprietary to the printing device. The proprietary print options are stored on the printing device. An identification of the document is stored on the printing device. A message is sent to the computing device to print the document with the standard print options. The document is received after it has been rendered by the computing device. The rendered document comprises printer ready data. The proprietary print options are merged with the rendered document before the rendered document is printed. The rendered document is printed using a printer.

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

Figure 1:
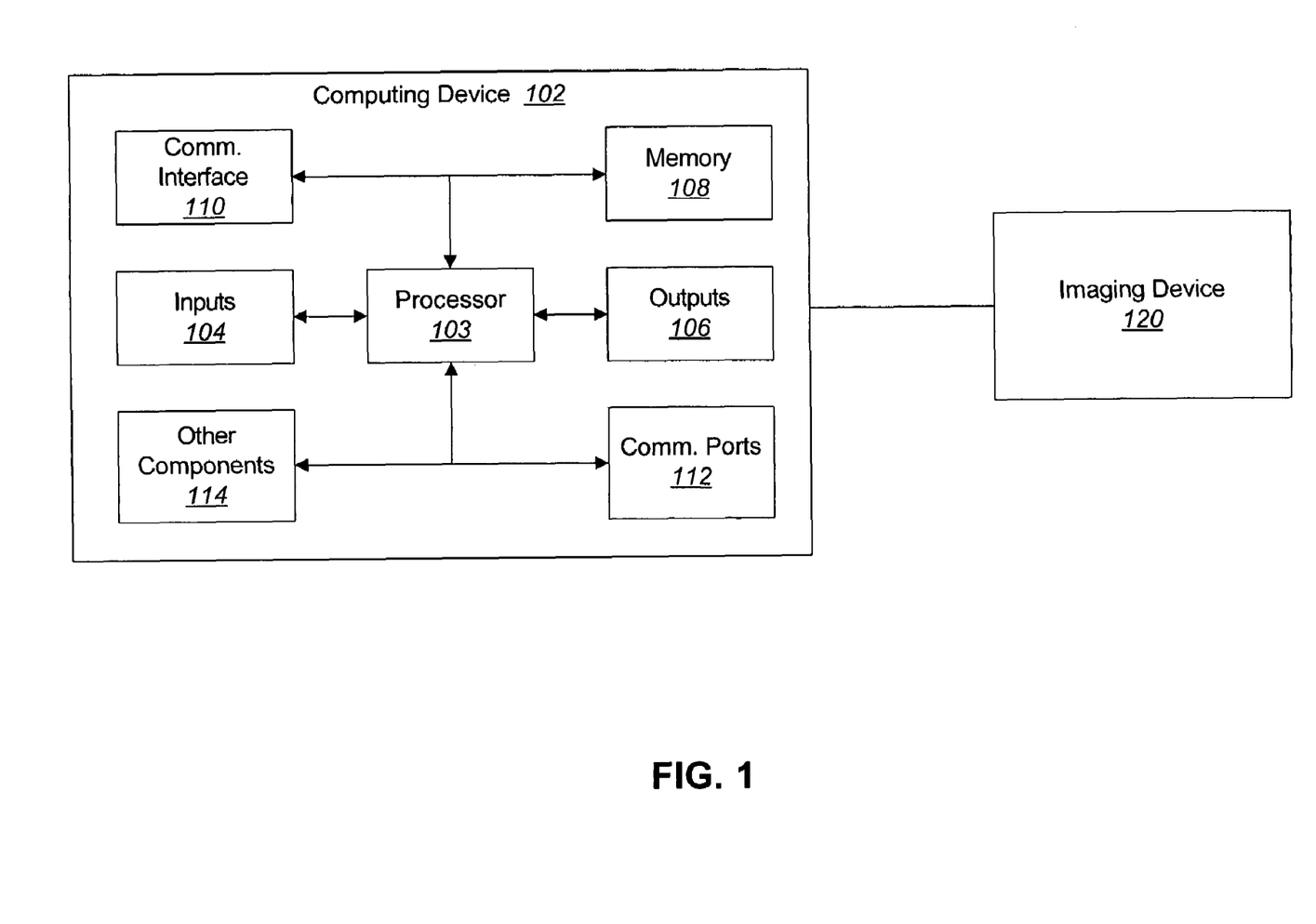
FIG. 1 is a block diagram illustrating the major hardware components typically utilized with embodiments herein.

FIG. 1 is a block diagram illustrating the major hardware components typically utilized with embodiments herein. The systems and methods disclosed may be used with a computing device 102 and an imaging device 120. Computing devices 102 are known in the art and are commercially available. The major hardware components typically utilized in a computing device 102 are illustrated in FIG. 1. A computing device 102 typically includes a processor 103 in electronic communication with input components or devices 104 and/or output components or devices 106. The processor 103 is operably connected to input 104 and/or output devices 106 capable of electronic communication with the processor 103, or, in other words, to devices capable of input and/or output in the form of an electrical signal. Embodiments of devices 102 may include the inputs 104, outputs 106 and the processor 103 within the same physical structure or in separate housings or structures.

The electronic device 102 may also include memory 108. The memory 108 may be a separate component from the processor 103, or it may be on-board memory 108 included in the same part as the processor 103. For example, microcontrollers often include a certain amount of on-board memory.

The processor 103 is also in electronic communication with a communication interface 110. The communication interface 110 may be used for communications with other devices 102, imaging devices 120, servers, etc. Thus, the communication interfaces 110 of the various devices 102 may be designed to communicate with each other to send signals or messages between the computing devices 102.

The computing device 102 may also include other communication ports 112. In addition, other components 114 may also be included in the electronic device 102.

Many kinds of different devices may be used with embodiments herein. The computing device 102 may be a one-chip computer, such as a microcontroller, a one-board type of computer, such as a controller, a typical desktop computer, such as an IBM-PC compatible, a Personal Digital Assistant (PDA), a Unix-based workstation, etc. Accordingly, the block diagram of FIG. 1 is only meant to illustrate typical components of a computing device 102 and is not meant to limit the scope of embodiments disclosed herein.

The computing device 102 is in electronic communication with the imaging device 120. An imaging device 120 is a device that receives or transmits an imaging job, such as a Multi-Function Peripheral ("MFP") or computing device. Imaging devices include, but are not limited to, physical printers, multi-functional peripherals, a printer pool, a printer cluster, a fax machine, a plotter, a scanner, a copier, a logical device, a computer monitor, a file, an electronic whiteboard, a document server, etc. A typical imaging device, such as a physical printer, fax machine, scanner, multi-functional peripheral or copier is a type of computing device. As a result, it also includes a processor, memory, communications interface, etc., as shown and illustrated in relation to FIG. 1. The imaging device may be a single or a plural grouping (e.g., pool or cluster) of two or more devices.

In light of the definition of an imaging device 120 above, the term imaging job, as used herein, is broadly defined as any instruction or set of instructions that are sent to an imaging device to cause an image to be printed, imaged, scanned, sent, etc., to or from the imaging device 120. Thus, the term imaging job includes, but is not limited to, a fax instruction or job to send a fax, a print job to print to a file, a print job to print to a particular window in a graphical user interface, a scan job to scan in an image from a scanner, a print job to print to a physical printer, a document manipulation job, a document conversion job, etc. Print jobs and printing devices are used to illustrate exemplary embodiments, but other kinds of imaging jobs and imaging devices may be used in implementations of the embodiments disclosed herein.

Figure 2:
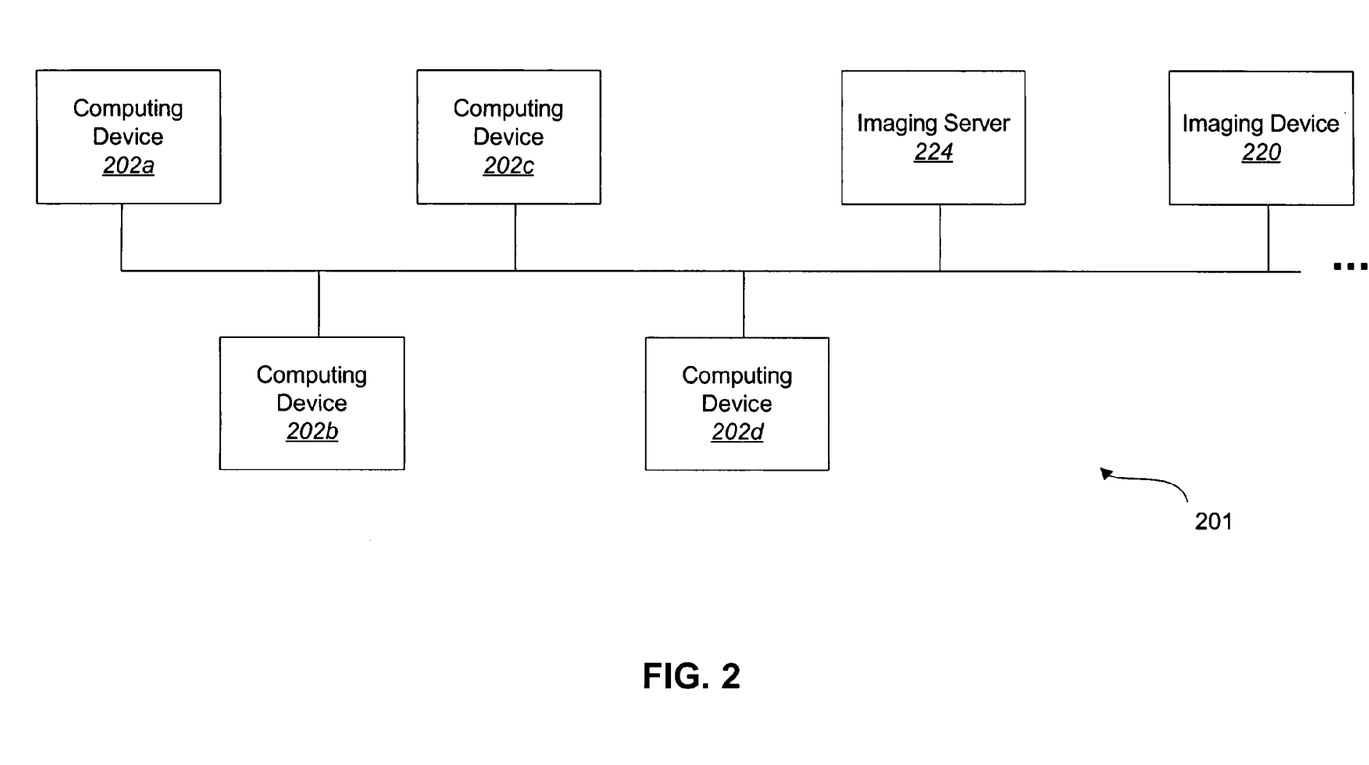
FIG. 2 is a network block diagram illustrating one possible environment in which the present systems and methods may be implemented.

FIG. 2 is a network block diagram illustrating one possible environment in which the present systems and methods may be implemented. The present systems and methods may also be implemented on a standalone computer system. FIG. 2 illustrates a computer network 201 comprising a plurality of computing devices 202, an imaging device 220 and an imaging server 224.

This invention is independent of the job control command and image data language and syntax. For example, the job control language may be PJL and the imaging job data language may be PCL or Postscript.

Herein, reference to computing devices that construct and despool an imaging job to, or receive from, either an imaging device or server, will be referred to as imaging clients. Herein, reference to computing devices that manage an imaging device and receive imaging jobs and respool the imaging job to/from an imaging device, will be referred to as imaging servers.

References to computing devices that construct and despool an imaging job to either an imaging device or server, will be referred to as client computing devices ( i.e., client ). Herein, reference to computing devices that centrally manage a shared imaging device by receiving despooled imaging jobs from multiple client computing devices and re-despools the imaging job to the imaging device, will be referred to as server computing devices (i.e., server).

The embodiments disclosed operate independently of how the imaging job is generated. For example, a print job may be generated by an application using a printer driver which spools a print job to the print spooler. By way of further example, the print job may be generated by direct printing using a utility that generates a print job ticket and despools the document data and job ticket directly to the printer.

The systems and methods herein are independent of the method to generate the imaging job and the method to despool the image job and/or imaging result to/from the imaging client and imaging device. For example, an imaging job may be generated by a printer driver from an application. The application would convert the document into printing instructions, such as GDI (i.e., Graphics Device Interface) in the Microsoft family of operating systems. The printing instructions would then be passed to a printer driver installed on the client and/or server associated with the printing device. The printer driver would then convert the printing instructions into a printer dependent format, such as a raster image or PDL (i.e., Page Description Language). In other cases, such as Direct Printing, the document format can be directly interpreted by the printer and there is no preprocessing of the document format into a printer dependent format.

The embodiments disclosed also operate independently of the protocol used between the client computing and imaging device to obtain the job completion status. For example, the protocol may be a proprietary protocol over TCP/IP, or an industry standard protocol such as LPR, 9100 and IPP.

The systems and methods of embodiments of the present invention typically comprise one or more printing devices, which may be connected locally, through a network or through a remote printing environment. These systems and methods may further comprise a computing device capable of generating or transmitting a print job to a printing device or transmitting the location of a print job to a printing device as in "pull printing." These embodiments may also comprise a printer driver, a spooler, a print processor and other print system components that process, transmit or otherwise function to produce a print job. In some embodiments, these components may exist in a Microsoft Windows 98, Me, NT, 2000, XP, 2003 Server® or similar operating system. Details of these operating system print system components and processes may be obtained by reference to the Microsoft Windows Driver Development Kits (DDKs) and associated documentation, which are hereby incorporated herein by reference.

Embodiments which utilize a Microsoft Windows® operating system generally comprise a printer driver, spooler, print processor, port monitor and other print system components which process print tasks generated through the operating system and applications running on the operating system. Embodiments used in conjunction with other operating systems will utilize print system components with similar functions, which may be referred to by the terms used in Microsoft systems.

Exemplary embodiments will be described with terminology related to a Microsoft Windows® environment, however these terms shall relate to equivalent elements in other operating systems. For example, the print processor described in many embodiments will relate to a print processor common in the Windows environment as well as elements with equivalent functions in other operating systems.

The definitions in this and subsequent paragraphs apply throughout this specification and related claims. The term "print job" may refer to any combination of data that can be printed. The term "printed" may refer to any task that renders data into hard or soft copy output. A print job may comprise text, line art and/or graphics and may comprise part of a page, a single page or many pages. Print jobs may be rendered or un-rendered. Generally, a print job is generated by an application, such as a word processor, spread sheet, etc., however, a print job may also comprise a file or data in memory that may be sent directly to a print process.

The term "network" may refer to any combination of computing devices and peripherals, such as printing devices, wherein the devices can communicate with each other. The term "network" may comprise Local Area Networks (LANs), Wide Area Networks (WANs) and many other network types. A network may be connected using conventional conductive cable, fiber-optic cable, phone line cable, power line cable or other electrical and light conductors and other signal transmission media as well as wireless connections using infrared, RF or other wireless methods.

To simplify discussion of a printing system used under a Microsoft Windows® operating system, some groups of system components may be referred to collectively. Some components may also be referred to generically by their group name. For example, a spooler API server may be referred to as a spooler. A group of components comprising a spooler client interface, spooler API server, router, print job creation API and job scheduling API may be referred to as a spooler in a Windows NT/2000 operating system. A group of components comprising a language monitor, port monitor and port driver stack may be referred to as a port manager. A group of components comprising a file format director and EMF print processor DLL may be referred to as a print processor. Equivalent component groups may also be referred to by these terms whether in a Microsoft operating system or another system.

References to a Microsoft Windows® or Windows operating system may refer to any version or variation of a Microsoft Windows operating system comprising Windows 95, Windows 98, Windows NT, Windows2000, Windows ME, Windows XP, Windows 2003 Server and others. While exemplary embodiments may be directed to a Windows operating system and environment, systems and methods directed to other operating systems such as Macintosh, UNIX, DOS, Linux, IBM MVS and AS/400 and others are to be contemplated within the scope of the present invention.

Embodiments may be embodied in software, firmware, hardware and other forms that achieve the function described herein. As embodiments may be adapted to many environments with varying computing devices, operating systems, printing devices, network hardware and software, applications and other variables, these embodiments may take many forms to achieve their function. Some embodiments may also be transmitted as signals, for example, and not by way of limitation, embodiments may be transmitted as analog or digital electrical signals or as light in a fiber-optic line. All of these embodiments are to be considered within the scope of the present invention.

In a typical printing environment, a user may initiate a print job, which generally comprises a single document generated by an application that is to be printed. In some embodiments of the present invention, a user may also initiate a print task, which may comprise one or more documents consisting of one or more pages each. A print task may also comprise multiple copies of a print job. A print job or task may be pre-processed into printer-ready data, such as output in a page description language (PDL) such as Printer Control Language (PCL), Adobe Postscript®, Adobe Portable Document Format (PDF) and Tagged-Image File Format (TIFF) as non-limiting examples. A print job or task may also be journaled. In a journaled print job or task, rendering instructions are recorded for subsequent playback. Some examples of journaled formats are Enhanced Metafile (EMF) and Sharp's Printer Meta file (PMF).

Generally, when a print job or task is initiated, a user makes an input selection to initiate the process. The initiating device, such as a computing or printing device may respond with the display of a dialog such as a print dialog box, a command line query, a panel display or some other form of user interface that allows a user to select print task options. One option may be the selection of the printing device such as a printer, plotter, Multi-Function Peripheral (MFP), CD burner or other device. Once the printing device is selected, a driver and, optionally, a print processor and other print system components may be loaded. Once the driver and/or other print system components are loaded, an additional dialog may be presented to prompt a user of options available on the selected device. Options such as print quality, paper size, orientation, tray selection, manual feed, stapling, watermarks, cluster printing, pool printing and other options may be selected.

In some embodiments of the present invention, print system components may present the user with a dialog that provides print job or print task interleaving options. Other embodiments may automatically select interleaving options for print jobs or tasks.

Once printing options have been selected or otherwise established, either manually or automatically, print job or task processing may commence. Print job or task processing may comprise construction of print job or print task specific information by the printer driver. This may comprise device initialization and environment data such as DEVMODE data in a Microsoft Windows® environment. Rendering instructions are then compiled and either recorded for deferred playback (journaled data) or processed into printer-ready data. In some cases, a print task may be partially or wholly rendered into printer-ready data in a previous step and the compilation of rendering instruction may be skipped or partially skipped.

The output from a print driver, in a spooled print environment, may be referred to as a spool file and its contents may be referred to as spool data. A spool file may be recorded on disk, in memory, in cache or other storage media compatible with a computing device. In embodiments herein, a spool file may comprise interleaving data. Interleaving data may comprise printer output mode options such as, but not limited to, output tray options, output page orientation, output page location, media selection or other criteria affecting aspects of printing device output.

When the spool file is complete, control is passed from the driver to another print system component. In some systems, control is passed to a print processor, which may determine whether the data is in a printer-ready format and process the data accordingly. If the data is in a printer-ready format, it may be sent to the port of the selected printing device. If the data is journaled, it may be further processed into a printer-ready format. This process may be referred to as spooling as the data is spooled from the spool file to its destination. Once journaled data is processed into printer-ready data, it may be despooled to the port associated with its destination printing device.

When a document is desired to be printed, the document is either in a printer ready format or needs to be converted into a printer ready format that is compatible with the printer. Once the document is in a printer ready format (i.e., print job), the print job can be either pushed to or pulled by the printer.

In the case of pull printing, the conventional methods have limitations that may not meet the needs or desire of the user. For example, in one method, as demonstrated by Novell Netware® pull print capability, the user initiates a print job at the host side. The document data is converted into printer ready data using a printer driver that is compatible with the printing device. The generated print job is then spooled to a print queue on a Novell Netware® print server. The printing device is configured to pull jobs from the print queue. In this method, whenever the printer is ready to accept another job, the printer queues the print queue(s) associated with the printer. If a print job is available, the printer initiates the de-spooling of the print job from the print queue to the printer (i.e., pull print). Once printed, the user then retrieves the printed output from the printer.

The Novell Netware® pull print method requires the user to be at two locations. This method requires the user to be (1) at the host to generate the print job, and (2) at the printer to receive the output. Furthermore this method requires a printer driver fully compatible with all the features, including proprietary features, of the printing device to utilize all the possible features.

In another method, the user is able to select a file for printing which is already in printer ready format (e.g., PRN in Microsoft Windows®) from the front panel of the printing device. In this method, the user is able to browse the network while at the printer, locate a PRN file, pull the PRN file to the printer (e.g., document delivery service), and initiate the printing of the job. This method has the advantage over the Novell Netware® pull print method in that the user is not required to be at a host system to initiate the print job. But this method does require that the document is pre-rendered. The pre-rendered options may conflict with the desired print options at the time of printing.

Figure 3:
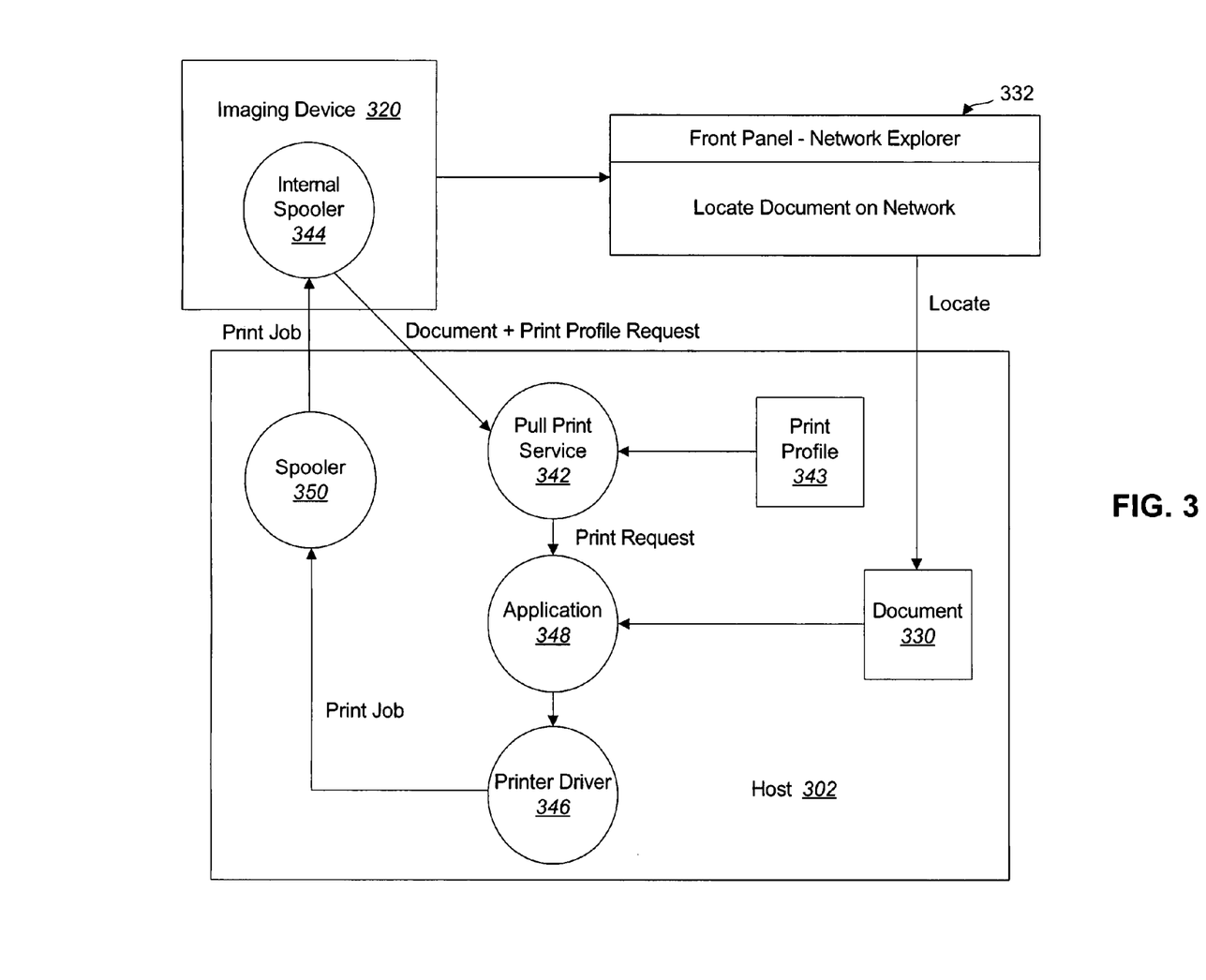
FIG. 3 is a logical block diagram of pull printing of a document initiated by the printer.

FIG. 3 is a logical block diagram of pull printing of a document 330 initiated by the printer 320. The user is able to select, from the front panel 332 of the imaging device 320, a file 330 that is in a native document format (i.e., not in a printer ready format) and render the document 330 into printer ready format using a printer profile 343 that is loaded on the host 302, or pushed to the host 302, where the document 330 is located. The host 302 is simply a computing device 102 that has the document 330. This method has the advantage over the Novell Netware® pull print method in that the user is not required to be at a host system to initiate the print job. Additionally, unlike other methods, in the embodiment of FIG. 3 the document 330 does not need to be pre-rendered into printer ready data. This method does require a printer driver 346 fully compatible with all the features, including proprietary, of the printing device 320 to utilize all the possible features. In addition, the printer profile 343 needs to be pre-constructed. The print options are limited to the printer profile 343.

A pull print service 342 may be used on the host 302 to send a print request to the application 348 associated with the document 330. The spooler 350 may be used to de-spool the print job to an internal spooler 344 of the imaging device 320.

Figure 4:
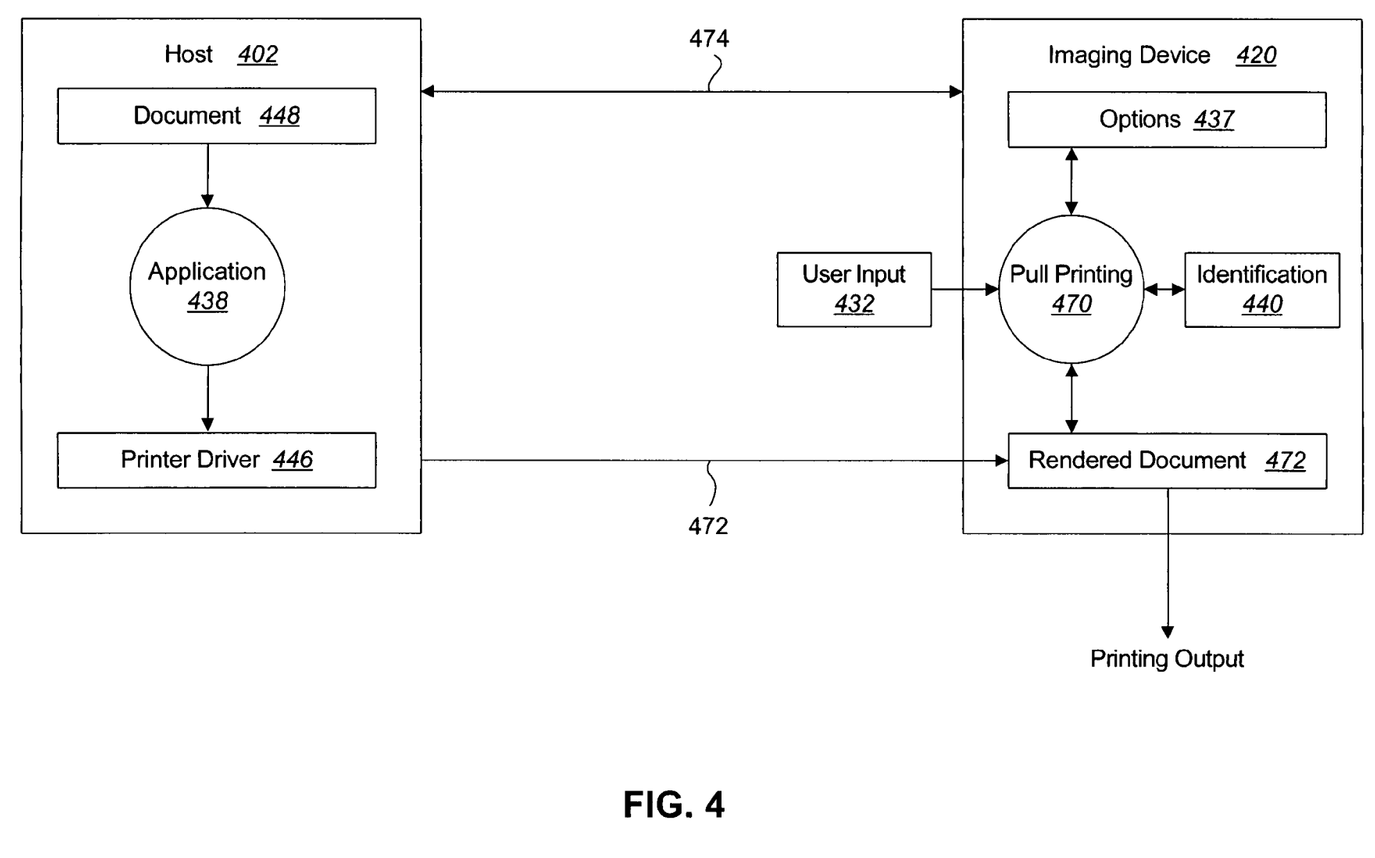
FIG. 4 is a logical block diagram of a system for pull print where rendering is initiated at the imaging device.

FIG. 4 is a logical block diagram of a system for pull print where rendering is initiated at the imaging device 420. The system includes a host 402 and an imaging device 420. The host 402 is any computing device 102.

With this system a user may initiate from a user interface 432 of the printer 420 (e.g., from the front panel of the printer 420) the printing of a document 448 located on a host 402. The document 448 is in a native document format (i.e., not pre-rendered into printer ready data). With this system the user can utilize many of the features of the printing device 420 without requiring a pre-defined printer profile and without requiring a fully compatible printer driver 446 on the host side 402. This system does not require the document 448 to be in printer ready format. The flow diagram of FIG. 5 illustrates a method of operation for the system shown in FIG. 4.

Figure 5:
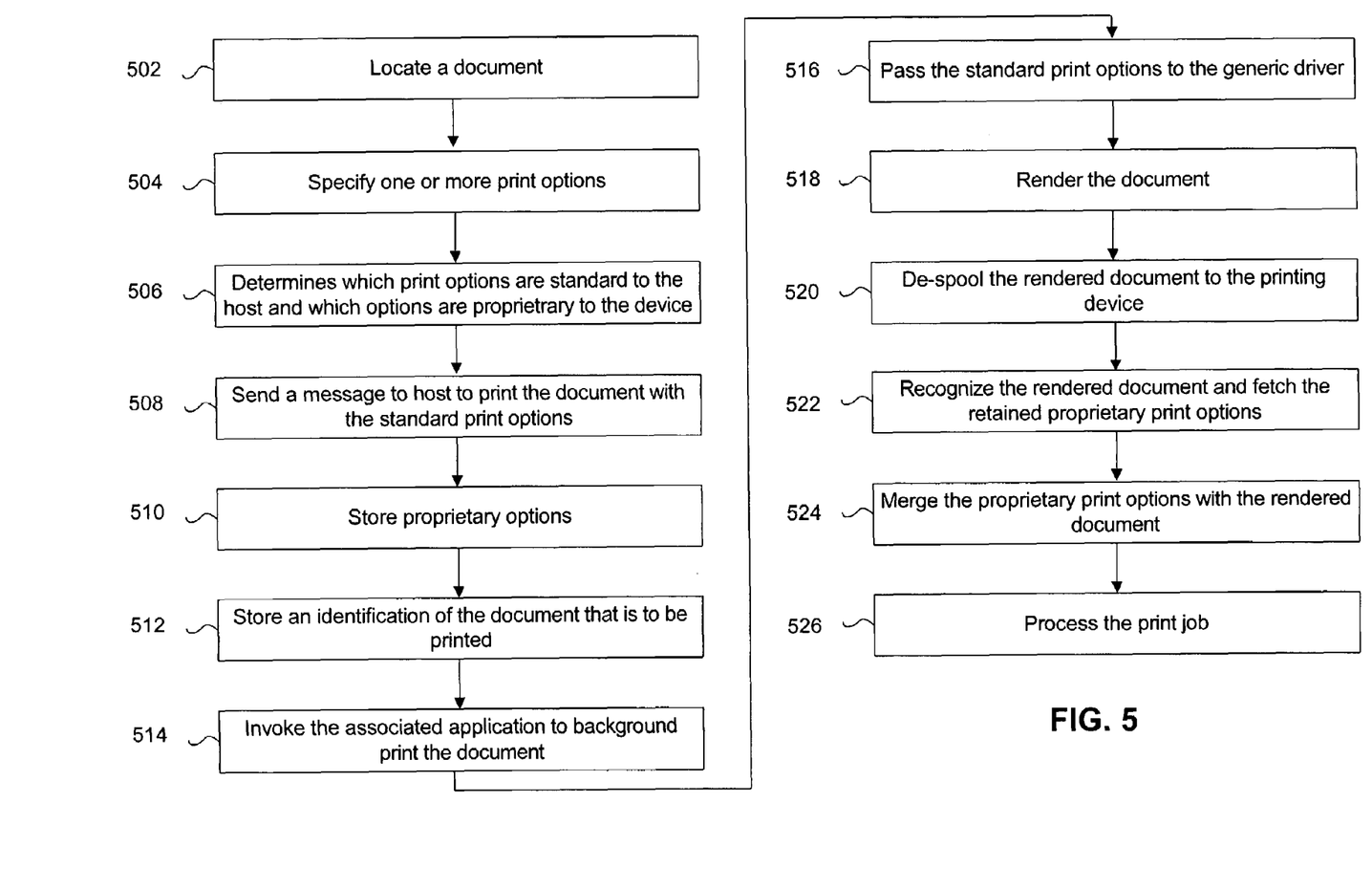
FIG. 5 is a flow diagram of one method of operation of the system of FIG. 4.

FIG. 5 is a flow diagram of one method of operation of the system of FIG. 4. As shown in FIG. 4, the system includes two components, one on the printing device 420 and one on the host device 402. The method shown in FIG. 5 includes actions that take place on both the printing device 420 and the host 402. On the printing device 420, the user is able to locate 502 a document 448 on the host 402 from the front panel 432. Once the document 448 has been located 502, the user can specify 504 one or more print options 437 (e.g., copies) from the front panel 432. The printing device 420 then determines 506 which print options 437 are standard to the host 402 side print subsystem (e.g., copies, collate, paper size, etc.) and which options 437 are proprietary to the device 420 (e.g., stapling, input tray, output bin). The printing device 420 then sends 508 a message 474 to a process on the host 402 side, where the document 448 is located, to print the document 448 with the subset of print options that are standard. The printing device 420 stores 510 or retains a copy of the proprietary options. The pull printing process 470 also stores 512 an identification 440 of the document 448 that is to be printed so that it 470 may be able to identify the rendered document 472 when it is sent to the imaging device 420.

On the host 402 side, a generic printer driver 446 (i.e., without proprietary option support) has been or is installed to render a document into printer ready data that is compatible with the PDL interpreter(s) (e.g., PCL) and standard print options of the printing device 420. The host side 402 process invokes 514 the application 438 associated with the document format to background print the document 448 to the specified printing device using the generic driver 446. The host 402 process passes 516 or presets (i.e., document defaults) the standard print options that are understood by the print subsystem to the generic driver 446.

The generic printer driver 446 then renders 518 the document accordingly. The print subsystem then de-spools 520 the rendered document 472 to the printing device 420. The printing device 420 recognizes 522 the instance of the rendered document 472 through use of the identification 440 (e.g., such as by network address of the host, a filename, or an embedded identifier in the print job) and fetches from storage the retained proprietary print options associated with the job. The printing device 420 then merges 524, by any manner, the proprietary print options with the rendered document and processes 526 the print job accordingly to produce printing output.

Various features of embodiments of the systems and methods herein are described below. First, methods of locating a document on the network, specifying print options and initiating the printing of the document from the front panel of an imaging device are discussed. Second, the reception of the print request by a process on the host side and rendering the document through a generic printer driver and de-spooling the rendered document back to the imaging device are discussed. Finally, completing the processing of the rendered document, plus the inclusion of proprietary print options, on the imaging device is set forth.

Figure 6:
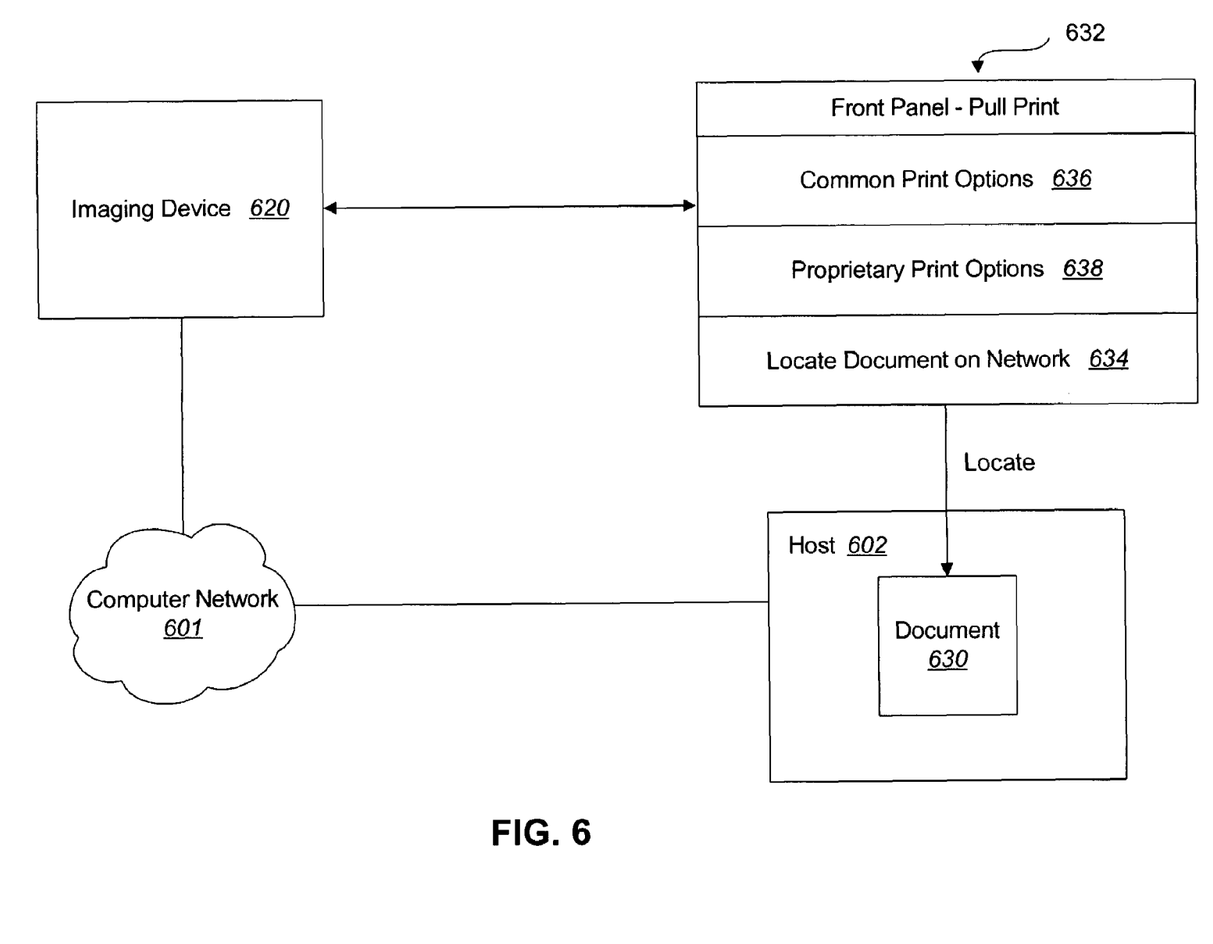
FIG. 6 is a logical block diagram illustrating use of the front panel of the imaging device to locate a document and specify print options.

FIG. 6 is a logical block diagram illustrating use of the front panel 632 of the imaging device 620 to locate a document 630 and specify print options. In this embodiment the user is able to browse a network, or locally connected such as by serial or parallel port, 601 that the imaging device 620 (i.e., imager) is connected to (i.e., LAN) or to a larger network (not shown) which the local network 601 has connectivity to (i.e., WAN). The user is able to browse the network 601 from the imaging device 620, such as from a front panel 632, a keyboard or PC attached to the device, or by a remote panel access such as an embedded device web page. Thus the user interface used by the user may be local to the device (e.g., front panel), or it may be remote (e.g., a web page).

Once the user has located 634 the document 630 or documents, the user can select the document(s) for printing. Before initiating the print job (e.g., depressing an OK button), the user can select print options 636, 638 from the front panel 632, or other access, in the same manner that one would select options for a copy job. There may be common print options 636 as well as proprietary print options 638. Input to the device 620 is from a rendered soft-copy versus a hard-copy scanned in, as in a traditional hard-copy.

Figure 7:
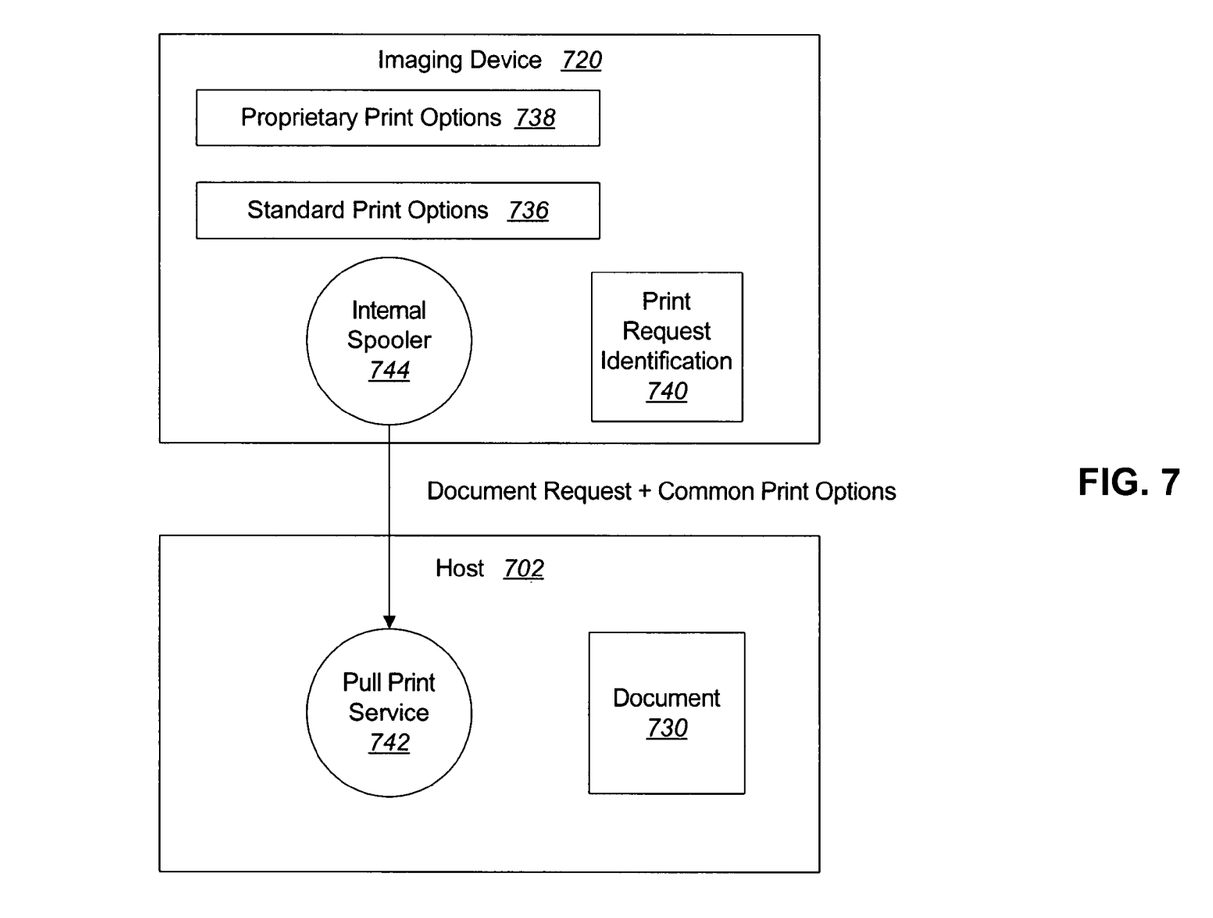
FIG. 7 is a logical block diagram of a request for rendering of the document with common print options.

FIG. 7 is a logical block diagram of a request for rendering of the document with print options, which may be applied to the document as a whole and/or a subset. When the user initiates the print job, the imaging device 720 splits the selected print options into two groups: a standard options group 736 and a proprietary options group 738. The standard options group 736 includes the print options that are standardized on the host's 702 print subsystem. A standard option 736 is an option that can be communicated via the print subsystem, such as an application communicating the print options through a graphical device interface (GDI), to a printer driver without specific knowledge of the printer driver. For example, in Microsoft Windows® family of operating systems, the standard print options 736 are the options defined in the device independent section of the DEVMODE data structure (e.g., copies, collation, duplex, paper size, etc.).

A proprietary option 738 is an option that cannot be communicated between an application and a printer driver without specific knowledge of the printer driver. For example, in Microsoft Windows®, finishing options such as hole punching and stapling are not part of the device independent section of the DEVMODE structure. Likewise, neither is specifying the output bin, or an input tray selection that is not predefined by the operating system.

The proprietary options 738 are then retained and stored in such a manner that they can be later retrieved by the imaging device 720, such as stored in memory (e.g., RAM), flash, or hard-disk. The proprietary options 738 are also stored in such a manner as to associate them with the print request. For example, the network path name of the document and the host network address where the document is located may be stored in a print request identification 740. The print request identification 740 information may be stored along with the proprietary options 738.

The imaging device 720 then establishes a connection with a process 742 on the host 702 side, herein referred to as the pull print service 742. An internal spooler 744 of the imaging device 720 sends a message through the communication path to the pull print service 742 to indicate the intent to print the document 730. The message would include an identification of the document 730 which may comprise, but is not limited to, the name of the document 730 and the standard print options 736. Additionally, the message may contain authentication information or other access rights control to enable the host 702 to grant access to print the document 730 on the imaging device 720. The message may also provide encryption information, such as a public key, for use in encrypting the print job.

In another embodiment the pull print service 742 may be on a computing device (e.g., server) other than the host 702 where the document 730 is located. In this embodiment, the pull print service 742 either pulls the document 730 to this computing device, or has the capability of initiating a print job on the host 702 where the document 730 is located.

Figure 8:
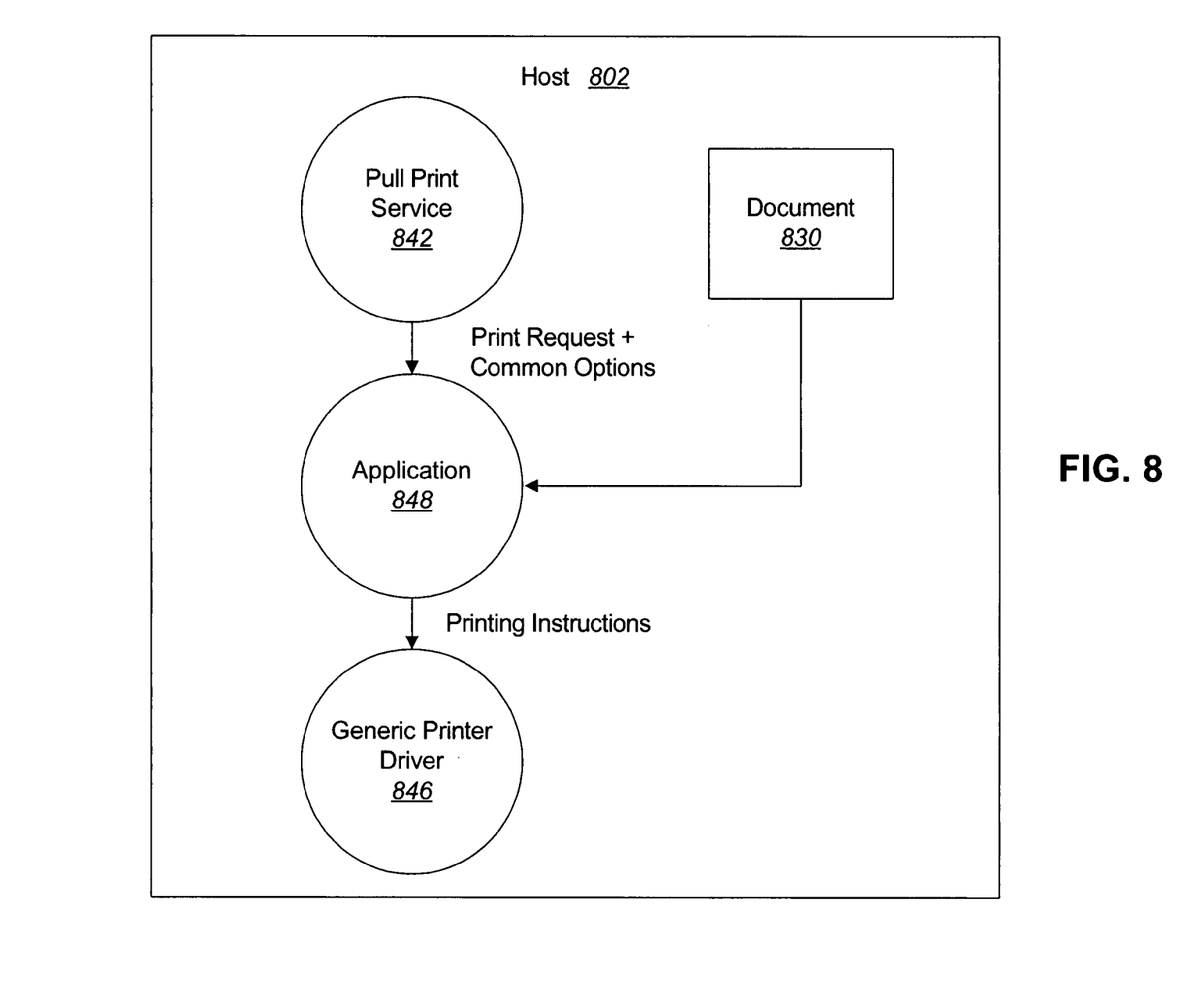
FIG. 8 is a logical block diagram of rendering the job using a generic printer driver.

FIG. 8 is a logical block diagram of rendering the job using a generic printer driver 846. Upon receipt of the print request from the imaging device 720, the pull print service 842 parses the message from the imaging device 720 to determine which document 830 to render and the standard print options 736. The pull print service 842 may determine other items in addition to or besides the document 830 to render and the standard print options 736.

The pull print service 842 then initiates a background print with the specified standard print options for the document 830. In Microsoft Windows® the pull print service 842 may be programmed to accomplish a variety of tasks. One possible task is to identify the application 848 associated with the document format. In one embodiment this may be accomplished by looking up the application 848 in the system registry using the file suffix of the document 830 as the indicator of the document format. Another task that may be performed by the pull print service 842 is to set the default document settings according to the specified standard print options for the imaging device 720 using the spooler API interface to the installed printer which is associated with the specified imaging device. A still further task may be to invoke the application 848 to background print the document 830 to the installed printer associated with the specified imaging device 720. In this embodiment, the generic printer driver 846 is a component of the installed printer.

Figure 9:
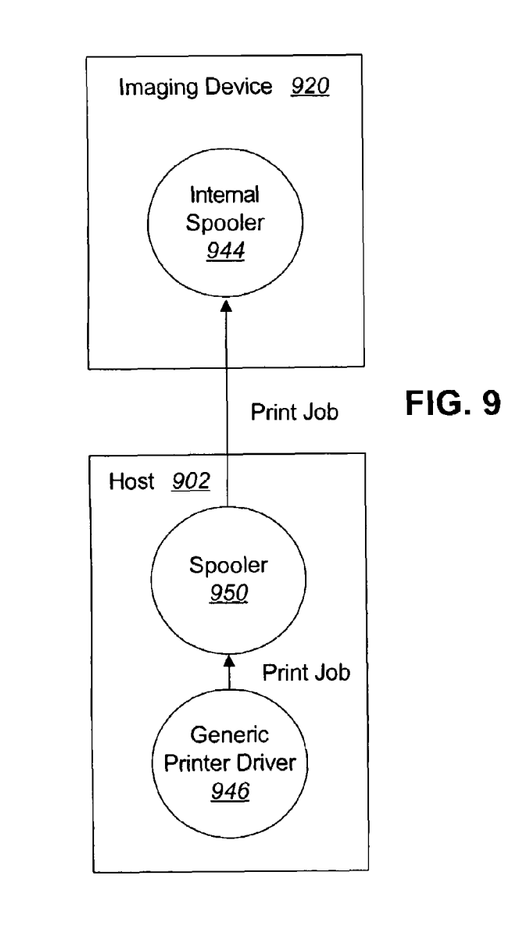
FIG. 9 is a logical block diagram illustrating the print job being spooled back to the imaging device.

FIG. 9 is a logical block diagram illustrating the print job being de-spooled back to the imaging device 920. The generic printer driver 946 then renders the document according to the specified standard print options and spools the rendered document (i.e., print job) to the print spooler 950. The print spooler 950 then, immediately or delayed, de-spools the print job through the de-spooling subsystem back to the imaging device 920. In Microsoft Windows®, the de-spooling subsystem typically consists of a print processor, port monitor and optional language monitor.

Figure 10:
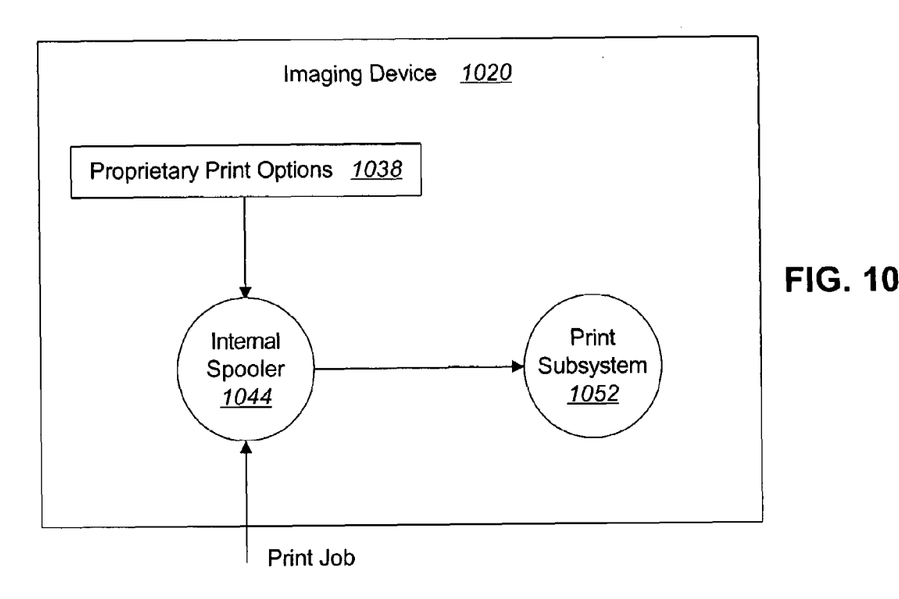
FIG. 10 is a logical block diagram illustrating the processing of the print job by the imaging device.

FIG. 10 is a logical block diagram illustrating the processing of the print job by the imaging device 1020. Upon receipt of the print job from the host 902, the imaging device 1020 determines if the received print job was originated as a pull print job. The imaging device 1020 may determine this by any manner. Several examples of methods for determining if the received print job was originated as a pull print job will be set forth. Other methods may also be used. One possible method is to use the network address (e.g., IP address) of the 902 host that de-spooled the print job to the imaging device 1020. The network address could be used as an index to identify the pull print job. Another method is to parse the print job to extract the document name. For example, the generic printer driver 946 could add either a commentary line (i.e., non-executing statement) or use a job control statement (e.g., @PJL SET JOBNAME= . . . ) to identify the network pathname of the rendered document. The network pathname could be used as an index to identify the pull print job.

If the print job is identified as a pull print job, then the imaging device 1020 retrieves the retained proprietary print options 1038 from storage associated with the identified pull print job. The imaging device 1020 then configures the processing of the print job, such as job and page settings, according to the retained proprietary options 1038, in a manner as if they had been specified within the print job. For example, the imaging device 1020 may pre-specify the settings in the corresponding subsystems and then force an override during interpretation of the print job when a command in the print job would conflict with a retained print option 1038. In addition, the imaging device 1020 may embed the proprietary options 1038 as print commands within the print job, prior to or while interpreting, in the appropriate print language syntax and location. The imaging device then processes the pull print job with the print subsystem 1052.

Other embodiments may include any imaging operation that is processed in whole or in part on the imaging device and which takes at least some of its input in electronic format (i.e., softcopy), such as fax, scan, copy and document management.

The present systems and methods may be implemented in many different embodiments. Other embodiments include but are not limited to the spooling and despooling subsystems of the Microsoft Windows® Operating System, the Apple MacIntosh operating system, the Linux operating system, UNIX operating systems such as System V Unix operating systems, BSD Unix operating systems, OSF Unix operating systems, Sun Solaris operating systems, HP/UX operating systems, IBM AIX, and other operating systems including, but not limited to, IBM Mainframe MVS operating system (OS/390) and IBM AS/400.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for pull printing a document, the method comprising:
   locating a document on a computing device from a printing device;
   sending a message to the computing device from the printing device to print the document with at least one print option;
   rendering the document at the computing device into printer ready data using the at least one print option thereby providing a rendered document; wherein the rendering is initiated at the printing device;
   de-spooling the rendered document to the printing device;
   processing another print option on the printing device; and
   printing the rendered document on the printing device.

2. The method of claim 1, further comprising specifying the at least one print option from the printing device after the document has been located.

3. The method of claim 2, wherein the specifying is accomplished through use of a front panel of the printing device.

4. The method of claim 1, wherein the message is sent to the computing device with a plurality of print options.

5. The method of claim 4, further comprising determining which of the plurality of print options are standard print options on the computing device and which of the plurality of print options are proprietary to the printing device.

6. The method of claim 5, further comprising storing the proprietary print options on the printing device.

7. The method of claim 6, further comprising storing an identification of the document on the printing device.

8. The method of claim 6, wherein the message is sent to the computing device to print the document with the standard print options and wherein the document is rendered at the computing device into printer ready data using the standard print options.

9. The method of claim 1, further comprising storing an identification of the document on the printing device.

10. The method of claim 1, wherein the document is rendered at the computing device into printer ready data that is compatible with a page description language interpreter.

11. The method of claim 1, further comprising invoking an application on the computing device that is associated with a document format to background print the document using a generic printer driver, wherein the document format is a native document format.

12. The method of claim 8, further comprising recognizing the rendered document at the printing device through use of the identification and fetching the stored proprietary print options.

13. The method of claim 12, further comprising merging the proprietary print options with the rendered document before the rendered document is printed.

14. A printing device configured for pull printing a document, the printing device comprising:
- a processor for control of the printing device;
- memory in electronic communication with the processor;
- a printer in electronic communication with the processor for printing;
- a communications port for electronic communications with a computing device;
- a control panel for operation of the printing device by a user, wherein the control panel is in electronic communication with the processor for receiving user inputs; and
- executable instructions executable by the processor, wherein the executable instructions are configured to:
  - provide a user interface at the control panel for the user to locate a document on the computing device;
  - obtain print options from the user, wherein the print options comprise Standard print options that are standard on the computing device and proprietary print options that are proprietary to the printing device;
  - store the proprietary print options;
  - store an identification of the document;
  - send a message to the computing device form the printing device to print the document with the standard print options, wherein rendering is initiated at the printing device;
  - receive the rendered document after it has been rendered by the computing device, wherein the rendered document comprises printer ready data;
  - merge the proprietary print options with the rendered document before the rendered document is printed; and
  - print the rendered document using the printing device.

15. The printing device of claim 14, wherein the executable instructions are further executable to cause an application to be started on the computing device that is associated with a document format to background print the document using a generic printer driver, wherein the document format is a native document format.

16. The printing device of claim 15, wherein the executable instructions are further executable to recognize the rendered document at the printing device through use of the identification.

17. The printing device of claim 16, wherein the executable instructions are further executable to fetch the proprietary print options before the proprietary print options are merged with the rendered document.

18. The printing device of claim 16, wherein the message sent to the computing device to print the document with the standard options is sent to a pull print service running on the computing device.

19. The printing device of claim 14, wherein the document, at the time the user locates the document on the computing device, is in a native document format and has not been pre-rendered into printer ready data.

20. The printing device of claim 14, wherein the executable instructions are further executable to determine which of the print options are the standard print options and which of the print options are the proprietary print options.

21. The printing device of claim 14, wherein the identification of the document includes a filename.

22. A computer-readable medium for storing program data, wherein the program data comprises executable instructions for:
- providing a user interface at a printing device for a user to locate a document on a computing device;
- obtaining print options from the user, wherein the print options comprise standard print options that are standard on the computing device and proprietary print options that are proprietary to the printing device;
- storing the proprietary print options on the printing device;
- storing an identification of the document on the printing device;
- sending a message to the computing device from the printing device to print the document with the standard print options, wherein rendering is initiated at the printing device;
- receiving the rendered document after it has been rendered by the computing device, wherein the rendered document comprises printer ready data;
- merging the proprietary print options with the rendered document before the rendered document is printed; and
- printing the rendered document using a printer.

23. The computer-readable medium of claim 22, wherein the executable instructions are further executable to cause an application to be started on the computing device that is associated with a document format to background print the document using a generic printer driver, wherein the document format is a native document format.

24. The computer-readable medium of claim 22, wherein the executable instructions are further executable to recognize the rendered document at the printing device through use of an identification.

25. The computer-readable medium of claim 22, wherein the executable instructions are further executable to fetch the proprietary print options before the proprietary print options are merged with the rendered document.

26. The computer-readable medium of claim 22, wherein the message sent to the computing device to print the document with the standard options is sent to a pull print service running on the computing device.

27. The computer-readable medium of claim 22, wherein the document, at the time the user locates the document on the computing device, is in a native document format and has not been pre-rendered into printer ready data.

28. The computer-readable medium of claim 22, wherein the executable instructions are further executable to determine which of the print options are the standard print options and which of the print options are the proprietary print options.

* * * * *

UNITED STATES PATENT AND TRADEMARK OFFICE
CERTIFICATE OF CORRECTION

PATENT NO. : 7,408,667 B2
APPLICATION NO. : 10/773891
DATED : August 5, 2008
INVENTOR(S) : Andrew R. Ferlitsch Page 1 of 1

It is certified that error appears in the above-identified patent and that said Letters Patent is hereby corrected as shown below:

In Column 15, line 28 please replace "Standard" with --standard--.
In Column 15, line 33 please replace "form" with --from--.

Signed and Sealed this

Thirtieth Day of December, 2008

JON W. DUDAS
*Director of the United States Patent and Trademark Office*